(12) United States Patent
Scown

(10) Patent No.: US 6,883,753 B1
(45) Date of Patent: Apr. 26, 2005

(54) OVERHEAD BIN AND MONUMENT ATTACHMENT SUPPORT SYSTEM

(75) Inventor: Stephen L. Scown, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/708,791

(22) Filed: Mar. 25, 2004

(51) Int. Cl.[7] ............................................. B64C 1/06
(52) U.S. Cl. .................................................. 244/118.1
(58) Field of Search ....................... 244/117 R, 118.1, 244/118.2, 118.5, 118.6, 119, 125, 131, 132

(56) References Cited

U.S. PATENT DOCUMENTS

| | | | | |
|---|---|---|---|---|
| 4,310,132 A | * | 1/1982 | Frosch et al. ............... | 244/119 |
| 4,648,570 A | * | 3/1987 | Abdelmaseh et al. .... | 244/118.1 |
| 5,108,048 A | * | 4/1992 | Chang ..................... | 244/118.1 |
| 5,518,208 A | * | 5/1996 | Roseburg ..................... | 244/132 |
| 5,839,694 A | * | 11/1998 | Bargull et al. ........... | 244/118.1 |
| 5,842,668 A | * | 12/1998 | Spencer .................... | 244/118.1 |
| 5,868,353 A | * | 2/1999 | Benard ..................... | 244/118.1 |
| 5,938,149 A | * | 8/1999 | Terwesten ................ | 244/118.5 |
| 6,007,024 A | * | 12/1999 | Stephan .................... | 244/118.1 |
| 6,045,204 A | * | 4/2000 | Frazier et al. .............. | 312/247 |
| 6,062,509 A | * | 5/2000 | Burrows et al. ......... | 244/118.5 |
| 6,241,186 B1 | * | 6/2001 | Calnon .................... | 244/118.5 |
| 6,496,745 B1 | * | 12/2002 | Killian ........................ | 700/95 |
| 6,513,755 B1 | * | 2/2003 | Lambiaso ................ | 244/118.1 |
| 6,527,325 B2 | * | 3/2003 | Steingrebe et al. ........ | 396/37.7 |
| 6,536,710 B1 | * | 3/2003 | Bobzien et al. ............ | 244/119 |
| 6,598,829 B2 | * | 7/2003 | Kamstra .................. | 244/118.1 |

\* cited by examiner

*Primary Examiner*—Teri P. Luu
*Assistant Examiner*—Stephen Holzen
(74) *Attorney, Agent, or Firm*—Artz & Artz, P.C.

(57) ABSTRACT

A monument support system (90) for an aircraft (92) includes multiple aircraft frame elements (16"). An adapter bridge (93) is coupled to the aircraft frame elements (16") and has multiple attachment points (20"). A coupling member (110) is coupled to the adapter bridge (93). A monument (96) is coupled to the frame elements (16") via the adapter bridge (93) and the coupling member (110).

40 Claims, 6 Drawing Sheets

OVERHEAD BIN AND MONUMENT ATTACHMENT SUPPORT SYSTEM

BACKGROUND OF INVENTION

The present invention is related generally to aircraft stowage bins and monuments. More particularly, the present invention is related to the attachment and support of stowage bins and monuments within an aircraft.

There exists an increasing demand for aircraft interior systems that are capable of supporting various interior features. The interior features include an increasing number of possible seat, bin, ceiling, and monument interior configurations that airline customers desire. A monument, for example, can refer to a stowage bin, a closet, a galley, a lavatory, or the like.

Support systems for interior features within a twin aisle aircraft, such as the Boeing Company 747 and 777 models, have become increasingly complex, due to the ever-increasing number of interior configurations that airline customers desire. The support systems are designed to account for a majority of the desired configurations. The support systems typically include four rails that extend the length of the passenger compartment of the aircraft to support stowage bins, ceilings, and monuments. The bins, ceilings, and monuments are directly attached to the rails via brackets in an overhead area of the aircraft. The support system aids in withstanding emergency landing loads, which can be upwards of approximately 9Gs. With the use of the rails, the support system allows the bins, ceilings, and monuments to be mounted within various areas of the aircraft with minimal affect on the structure of the aircraft.

The rails are attached via struts and tie rods to lateral arched frame supports, on which the aircraft skin is attached. The rails can each be approximately 1500 inches in length and have considerable mass. A large quantity of the struts and tie rods are typically utilized, which include the use of vertical and horizontal struts, and lateral and 9G tie rods. The weight of such a support system can be approximately 1000–1500 lbs more than a simple tie rod support system that does not utilize the rails and directly couples bins and monuments to frame elements. Although the rail support system provides increased configuration flexibility over that of a simple tie rod support system, it is expensive to manufacture and implement. Also, due to the additional weight of the rails, fuel consumption and therefore range of an aircraft can be affected.

The support systems can also include a center bin support ladder. The support ladder includes a pair of the above-mentioned rails with many cross-members coupled laterally between the rails, each cross-member sequentially placed laterally along the length of the aircraft. Although the cross-members provide additional support, they also increase the weight of the support system.

Also, in accounting for various interior feature configurations one needs to account for various sized bins and monuments, which may include bins and monuments of nonstandard sizes and shapes. Currently, irregularly sized and shaped bins and monuments can be mounted on the above-stated rails which have attachment holes along the length of the rails.

Thus, there exists a need for an improved bin, ceiling, and monument support system that has minimum size and weight, is easy to incorporate within an aircraft, is cost effective, accounts for various interior feature configurations, and is capable of withstanding emergency landing loads.

SUMMARY OF INVENTION

One embodiment of the present invention provides a monument support system for an aircraft that includes multiple aircraft frame elements. An adapter bridge is coupled to the aircraft frame elements and has multiple attachment points. A coupling member is coupled to the adapter bridge. A monument is coupled to the frame elements via the adapter bridge and the coupling member.

The embodiments of the present invention provide several advantages. One such advantage is the provision of a bin and monument support system that utilizes adapter bridges instead of rails to support bins and monuments of an aircraft. The use of the adaptor bridges accounts for irregular sized stowage bins and for instances when stowage bins do not align properly with frame elements of an aircraft. The use of adapter bridges also minimizes the amount, size, weight, and cost of materials and components utilized to support the bins and monuments. The adapter bridges allow for various interior feature configurations and support thereof.

Another advantage provided by an embodiment of the present invention is the provision of a bin and monument support system that in addition to the above stated advantage also provides adequate and appropriate support of bins and monuments during an emergency landing of an aircraft.

Yet another advantage provided by still another embodiment of the present invention is the provision of a bin and monument support system that accounts for movement between components and structures and for variations in tolerances of bin, monument, and aircraft structures. In so doing, the stated embodiment minimizes the preloading of support system components, bins, and monuments during manufacturing and minimizes the fatigue experienced during the operation of an aircraft, which increases life of the components, bins, and monuments and aids in maintaining integrity thereof.

The present invention itself, together with further objects and attendant advantages, will be best understood by reference to the following detailed description, taken in conjunction with the accompanying drawing.

DETAILED DESCRIPTION

Figure 1:
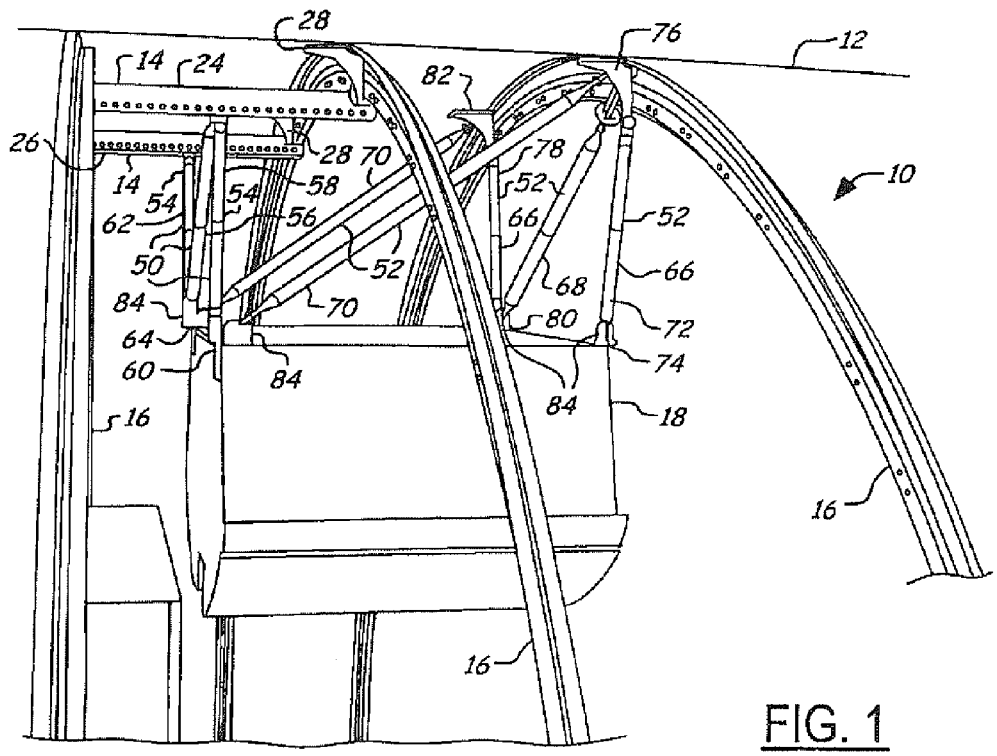
FIG. 1 is a perspective side view of an overhead bin support system for an aircraft in accordance with an embodiment of the present invention.

In the following Figures the same reference numerals will be used to refer to the same components. While the present invention is described primarily with respect to overhead bin and monument support systems for an aircraft, the present invention may be adapted and applied in various vehicle and non-vehicle applications. The present invention may be applied in aeronautical applications, nautical applications, railway applications, automotive vehicle applications, and commercial and residential applications, as well as in other applications known in the art where stowage bins and monuments of various size and shape are utilized and supported.

In the following description, various operating parameters and components are described for one constructed embodiment. These specific parameters and components are included as examples and are not meant to be limiting.

Figure 2:
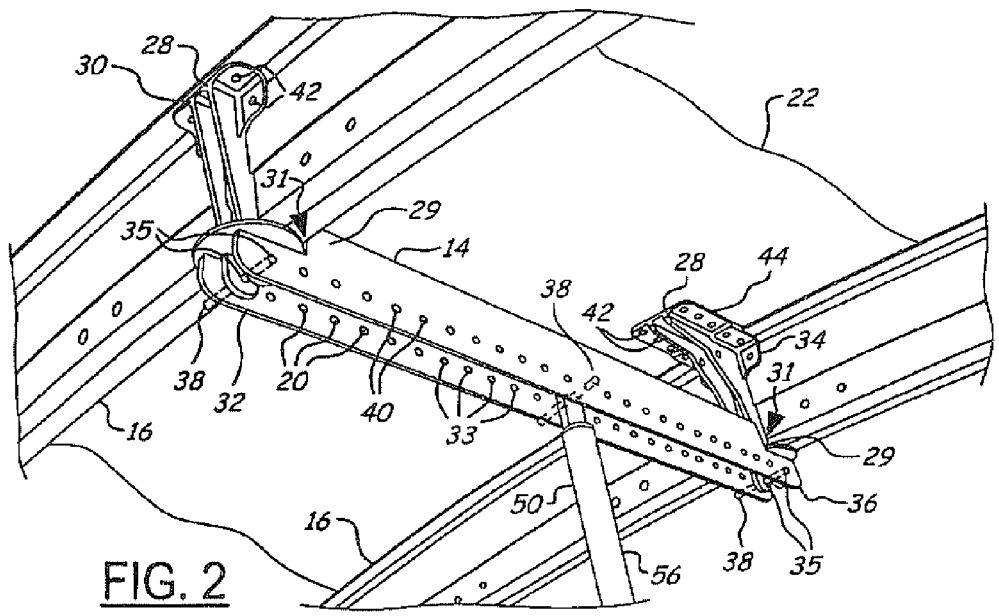
FIG. 2 is a close-up perspective view of an adapter bridge and related components of the bin support system of FIG. 1.

Referring now to FIGS. 1 and 2, a perspective side view of an overhead bin support system 10 for an aircraft 12 and a close-up perspective view of an adapter bridge 14 and related components of the bin support system 10 are shown in accordance with an embodiment of the present invention. The bin support system 10 includes the bin adapter bridges 14, aircraft frame elements 16, and one or more bins 18 (only one is shown). The bin bridges 14 are utilized to support the bins 18, which may be of varying sizes. The bin bridges 14 span between the frame elements 16 and have multiple attachment points 20. The attachment points 20 allow the bins 18 to be attached to the frame elements 16 in various corresponding positions.

The frame elements 16 are used to support the bins 18 in an overhead position within the aircraft 12. The frame elements 16 are arched and extend laterally and radially across and around an outer perimeter of the aircraft 12. The frame elements 16 support an outer aircraft skin 22 and aid in maintaining structural integrity and shape of the aircraft 12.

Figure 6:
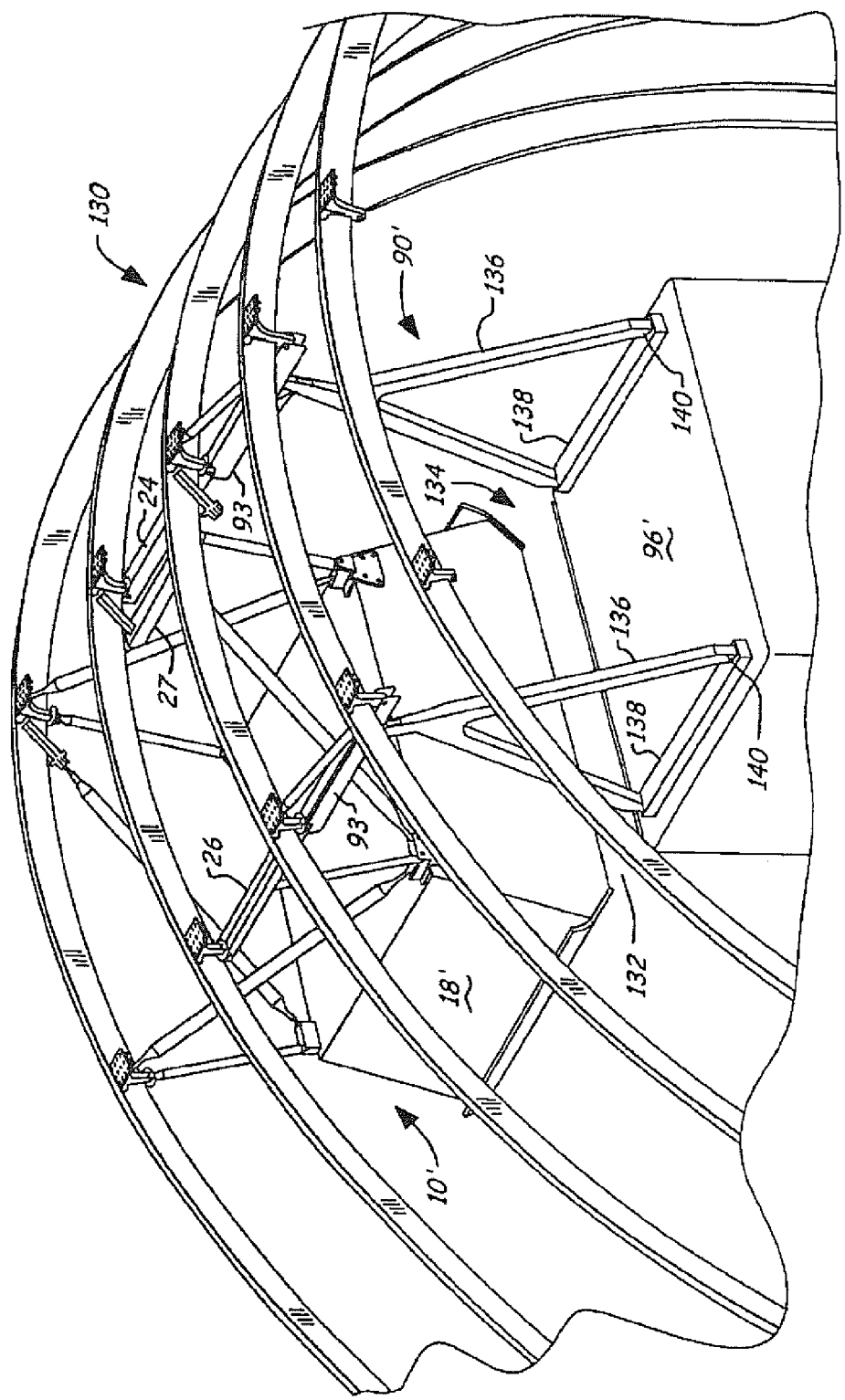
FIG. 6 is an upper perspective view of an overhead bin and monument support system in accordance with another embodiment of the present invention.

The bin bridges 14 include a first bin adapter bridge 24 and a second bin adapter bridge 26 that are used for the transfer of radial loads and a third bin adapter bridge 27, which is used for the transfer of lateral loads on the bin 18. The third bin bridge is best seen in FIG. 6. The bin bridges 14 span across the frame elements 16 between a first set of brackets 28. The bin bridges have notches 29 that allow the bridges 14 to lock in a fore and aft position between the frame elements 16. The shape of the notches 29 is similar to the shape of a lower portion 31 of the brackets 28. The notches 29 also allow the bin bridges 14 to be recessed between the frame elements 16 to allow the pin attachment holes 33 between the devises 28 and the bridges 14 to vertically align with the other attachment holes 33 for attachment of coupling members, such as coupling members 50. The notches 29 and the vertical alignments of the pin attachment holes 35 with the remaining attachment holes 33 therebetween provides stability of the bin 18. The attachment points correspond with the attachment holes 33 and 35. The attachment holes 33 and 35 although shown as being one inch apart may have various other separation distance configurations.

The bin bridges 14 are coupled to a forward bracket 30 on a first end 32 and to a rearward bracket 34 on a second end 36 via pins 38. The pins 38 may be of various types and styles as known in the art, examples of which are quick release pins and threaded fasteners. The bin bridges 14 may be in the form of a single unitary structure, as shown in FIGS. 1 and 2, or may be formed of multiple bridge plates, such as the adapter bridge shown in FIG. 3. The bin bridges 14 may have any number of the attachment points 20. The attachment points consist of a series of holes on each side or plate 40 of the bin bridges 14.

The first brackets 28 may be fixed to the frame elements as shown utilizing rivets or Hilock™ fasteners 42. The first brackets 28 may be in the form of clevises, fittings, frame pivot fittings, or other brackets or fittings known in the art. When a clevis fitting is utilized, as shown, the clevis fitting may be a radial load fitting, such as clevis fitting 30, or may be in the form of a forward and radial load clevis fitting, such as the clevis fitting 34. The forward and radial load clevis fitting 34 is similar to the radial load clevis fitting 30, but it includes an extended foot 44 for further attachment to the skin 22. The extended foot 44 is utilized to transfer forward load to the skin 22 rather than into the frame elements 16.

The bins 18 may be in the form of center bins, as shown, or may be in some other form, such as an outboard bin or some other type of overhead bin. The bins 18 may be stowage bins or used for some other purpose known in the art. The bins 18 are coupled to the bin bridges 14 via a first set of coupling members 50 and to the frame elements 16 via a second set of coupling members 52.

The first set of coupling members 50 includes a pair of vertical struts 54 and a first lateral tie rod 56. The first pair of vertical struts 54 orients the bins 18 in a fixed vertical position relative to the bin bridges 14. The struts 54 include a first strut 58 that extends between a first corner 60 of the bins 18 to the first bin bridge 24 and a second strut 62 that extends between a second corner 64 of the bins 18 to the second bin bridge 26. The first lateral tie rod 56 extends laterally from the first corner 60 to the third bin bridge 27. The bin bridges 14 may be coupled to the brackets 28 and the coupling members 50 via pins, such as pins 38.

The second set of coupling members 52 includes a second pair of vertical struts 66, a second lateral tie rod 68, and a pair of fore/aft tie rods 70. The second struts 66 include a third strut 72 that extends from a third corner 74 of the bins 18 to a first forward and radial load clevis 76 and a forth strut 78 that extends between a forth corner 80 of the bins 18 and a second forward and radial load clevis 82. The second lateral tie rod 68 extends between the forth corner 80 and the first load clevis 76. The fore/aft struts 70 extend between the first corner 60 and the first load clevis 76, and between the second corner 64 and the second load clevis 82, respectively. Mounting brackets 84 are used to couple the struts 52 and 54, the lateral tie rods 56 and 68, and the fore/aft struts 70 to the bins 18. The coupling members 50 and 52 may be coupled to the brackets 84 using pins, such as pins 38, or other attachment mechanisms, such as threaded fasteners, clips, bolts, etc.

The first pair of struts 54 and the first tie rod 56 may be coupled to any of the attachment points 20. In adjusting the attachment of the first pair of struts 54 and the first tie rod 56, the bins 18 may be repositioned relative to the bin bridges 14 and the frame elements 16 and in the fore, aft, and vertical directions.

The coupling members 50 and 52 may be in the form of tie rods, lateral tie rods, vertical tie rods, struts, trusses, brackets, or may be of some other types or styles known in the art. The coupling members 50 and 52 may be hollow and contain bearings for pins to pass therethrough when coupling to brackets, such as brackets 84. The coupling members 50 and 52 may be rated to withstand varying levels of acceleration. In one embodiment of the present invention, the fore/aft tie rods 70 are 9G rated.

The pins 38 may be of various types and styles. Also, although the pins 38 are shown as being utilized to couple the bin bridges 14 to the brackets 28 and the coupling members 50, other known attachment techniques may be utilized, some of which are stated above.

The bin bridges 14, frame elements 16, and brackets 84 may be formed of aluminum or other lightweight materials known in the art. Although a specific number of bin bridges 14, frame elements 16, bins 18, and brackets 84 are shown any number of each may be utilized.

Figure 5:
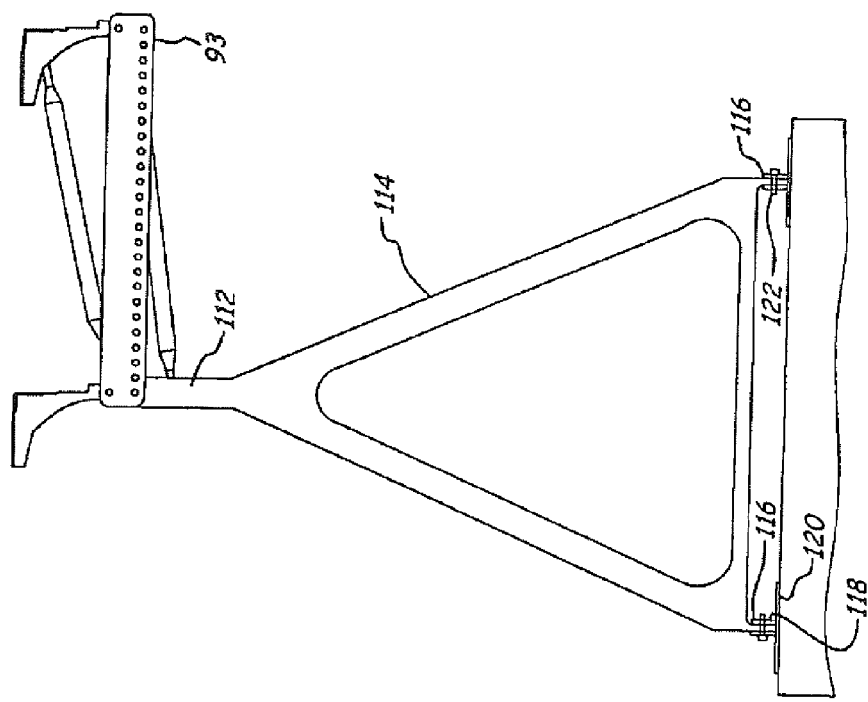
FIG. 5 is a side view of the monument support system of FIG. 3.
Figure 3:
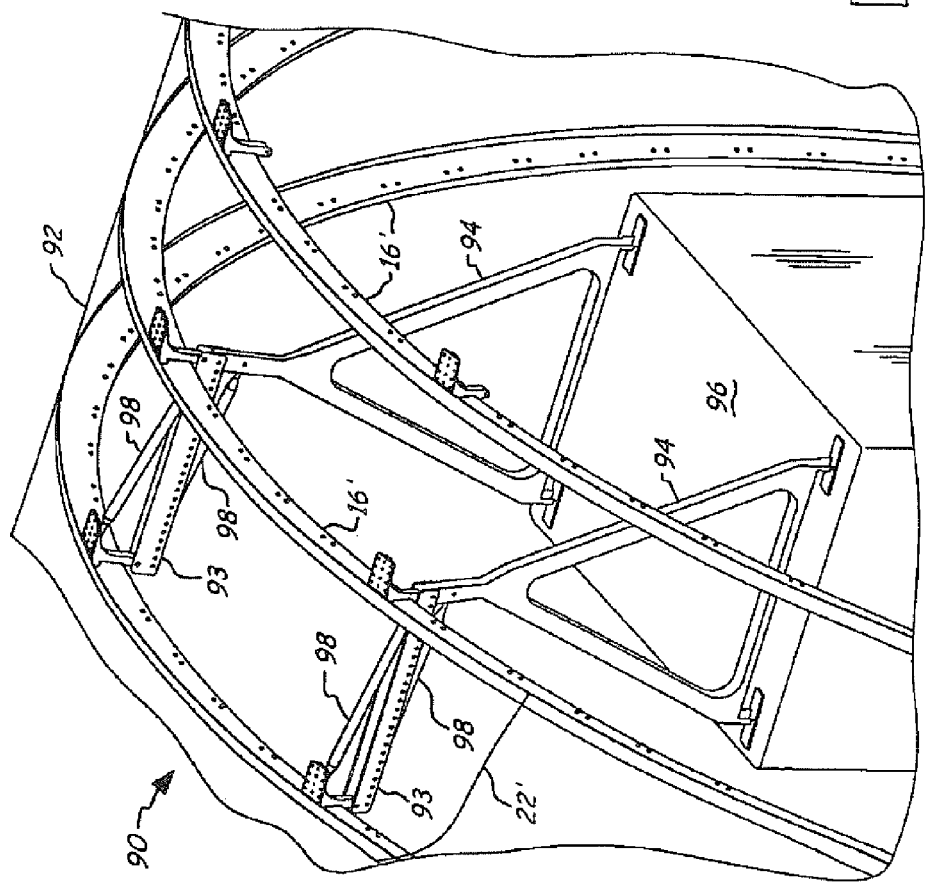
FIG. 3 is an overhead monument support system for an aircraft in accordance with another embodiment of the present invention.
Figure 4:
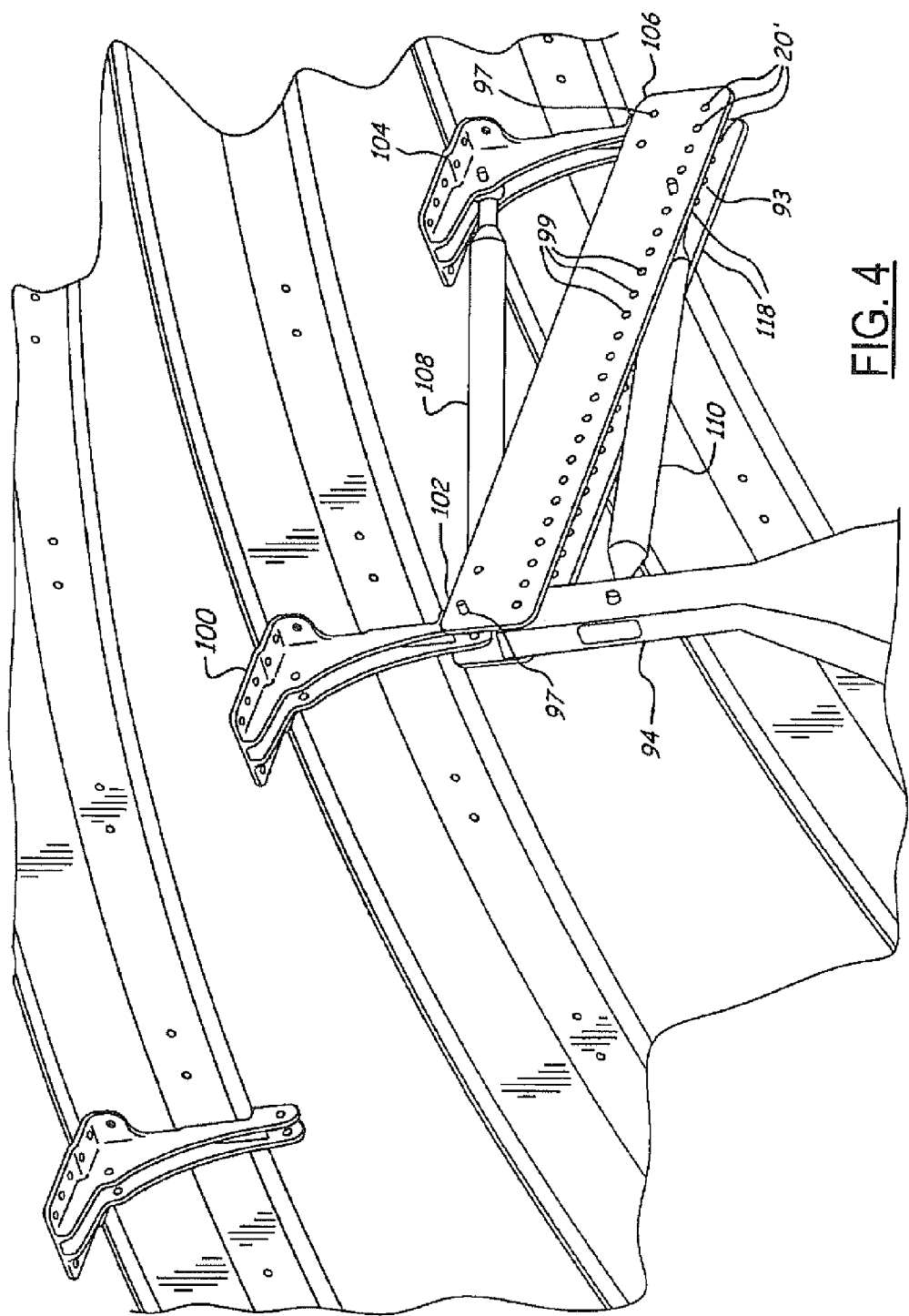
FIG. 4 is a close-up perspective view of an adapter bridge and related components of the monument support system of FIG. 3.

Referring now to FIGS. 3–5, an overhead monument support system 90 for an aircraft 92, a close-up perspective view of a monument adapter bridge 93 and related components of the monument support system 90, and a side view of the monument support system 90 are shown in accordance with another embodiment of the present invention. The monument support system 90 includes the monument bridges 93, the aircraft frame elements 16", and the trusses 94. The monument bridges 93 and the frame elements 16" are similar to the bin bridges 14 and the frame elements 16. As with the bin bridges 14, the monument bridges 93 are coupled between the frame elements 16" and have multiple attachment points 20". A monument 96 is coupled to the attachment points 20" via the coupling members 98.

The monument bridge 93 has bracket attachment holes 97, which are separate from and vertically higher than coupling member attachment holes 99. The attachment points 20" correspond with the coupling member holes 99. The coupling member holes are lower than the bracket holes 97 to allow horizontal or fore and aft position adjustment of the monument 96 or to allow the truss 94 to be slide within the monument bridge 93.

Each monument bridge 93 is coupled to the frame elements 16" via a first forward and radial load clevis 100, on a first or forward end 102, and a second forward and radial load clevis 104, on a second or rearward end 106. Although forward and radial load devises are utilized, other attachment mechanisms known in the art may be utilized.

Each truss 94 is coupled to the second clevis 104 via the monument bridges 93 and the coupling members 98, which include an upper tie rod 108 and a lower tie rod 110. The upper tie rod 108 is coupled between the second clevis 104 and the forward end 102. The lower tie rod 110 is coupled between rearward end 106 and the truss 94. The coupling members 98 may also be in the form of tie rods, struts, and brackets. In one embodiment of the present invention, the coupling members 98 are 9G rated.

The monument bridge 93 and the tie rods 108 and 110 form a Z-configuration for transferring load from the monument 96 to the second clevis 104 and into the skin 22". Forward load on the monument 96 is transferred through the trusses 94 into the lower tie rods 110, through the monument bridges 93, across the upper tie rods 108, and into the second devises 104 and the skin 22". During loading of the monument bridges 93 and the tie rods 108 and 110, the adapter bridge is in compression and the tie rods 108 and 110 are in tension, although this configuration could be reversed.

The trusses 94 have vertical sections 112 and triangular sections 114 with attachment feet 116. The trusses 94 are utilized when the vertical distance between the lower tie rods 110 and the monument 96 is greater than a predetermined distance. The lower tie rods 110 may be directly coupled to the monument 96 without use of the trusses 94.

The vertical sections 112 are coupled to the lower tie rods 110 and reside between plates 118 of the monument bridges 93. The vertical sections 112 are able to slide between the plates 118 or relative to the monument bridges 93. The ability of the trusses 94 to translate or slide relative to the monument bridges 93 accounts for movement in the floor of the aircraft 92 relative to the frame elements 16" and prevents stress and fatigue on components of the monument support system 90 and of the aircraft 92. The shapes and styles of the trusses 94 aid in stabilizing the monument during 9G loading, directing the loading experienced by the monument 96 into the lower tie rods 110, and minimizing weight of the trusses 94. Although the trusses 94 are shown having a single shape and style, they may be of various other shapes and styles.

The attachment feet 116 are configured to reside between and couple to the tabs 118 of monument brackets 120, which are directly coupled to the monument 96. The feet 116 are coupled to the tabs 118 via pin joints 122, as shown in FIG. 5. The pin joints 122 allow the trusses 94 to pivot relative to the monument 96 to relieve and prevent stress and bending moments on the monument 96 during use and installation thereof. Of course, other mechanisms may be utilized to couple the trusses 94 to the monument 96.

The monument 96 is adjustable in position relative to the monument bridges 93 via use of the attachment points 20". The monument 96 may be a galley, a stowage unit, a lavatory, a closet, or other monument known in the art.

Referring now to FIG. 6, an upper perspective view of an overhead bin and monument support system 130 in accordance with another embodiment of the present invention is shown. The bin and monument system 130 includes a bin support system 10" and a monument support system 90" that are utilized in series. An end cap 132 resides between the bin 18" and the monument 96" to fill in the gap 134 therebetween and provide an aesthetically pleasing interior. The bin system 10" is similar to the bin system 10. The monument system 90" is similar to the monument system 90 except that the trusses 136 of the monument system 90" are V-shaped and are coupled to monument rails 138, which are directly coupled to the monument 96". The trusses 136 may also be coupled to the rails 138 via pin joints 140 or other coupling mechanisms.

Figure 7:
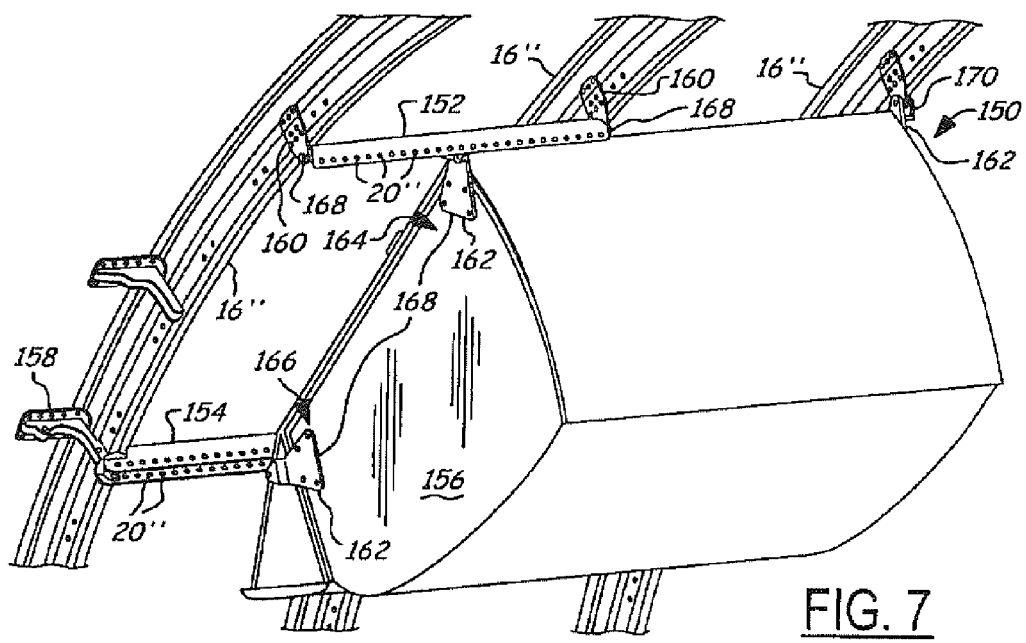
FIG. 7 is a close-up inboard perspective view of an overhead outboard bin support system in accordance with still another embodiment of the present invention.

Referring now to FIG. 7, a close-up inboard perspective view of an overhead outboard bin support system 150 in accordance with still another embodiment of the present invention is shown. The outboard system 150 includes an upper pivoting adapter bridge 152 and a lower rigidly fixed or non-rotatable adapter bridge 154. The outboard bin 156 is coupled to the frame elements 16" via the adapter bridges 152 and 154, the clevis brackets 158 (only one is shown), a pair of frame pivoting brackets 160, and a set of bin attachment brackets 162. The upper adapter bridge 152 is coupled to a first portion 164 of the bin 156 and the lower adapter bridge 154 is coupled to a second portion 166 of the bin 156. The first portion 164 is on the same side of the bin 156 as the second portion 166. The bin attachment brackets 162 include a pair of brackets 168 and a bin-pivoting bracket 170.

The adapter bridges 152 and 154 and the devises 158 are similar to the adapter bridges 14 and the devises 34, 100, and 104. The upper adapter bridge 152, however, is able to pivot or rotate relative to the frame elements 16"" and the bin 156, via the pivot joints 168, between the pair of pivoting brackets 160 and the upper adapter bridge 152. The pivot joints 168 may be in the form of steel bushings, as shown, have rubber cartridges, or may be in some other form known in the art. The lower adapter bridge 154 is coupled to the frame elements 16"" via the devises 158.

The brackets 168 are coupled to the bin 156 and to any of the attachment points 20"" of the adapter bridges 152 and 154. The brackets 168 may also be coupled to the adapter bridges 152 and 154 via pin joints or other coupling mechanisms known in the art.

Figure 8:
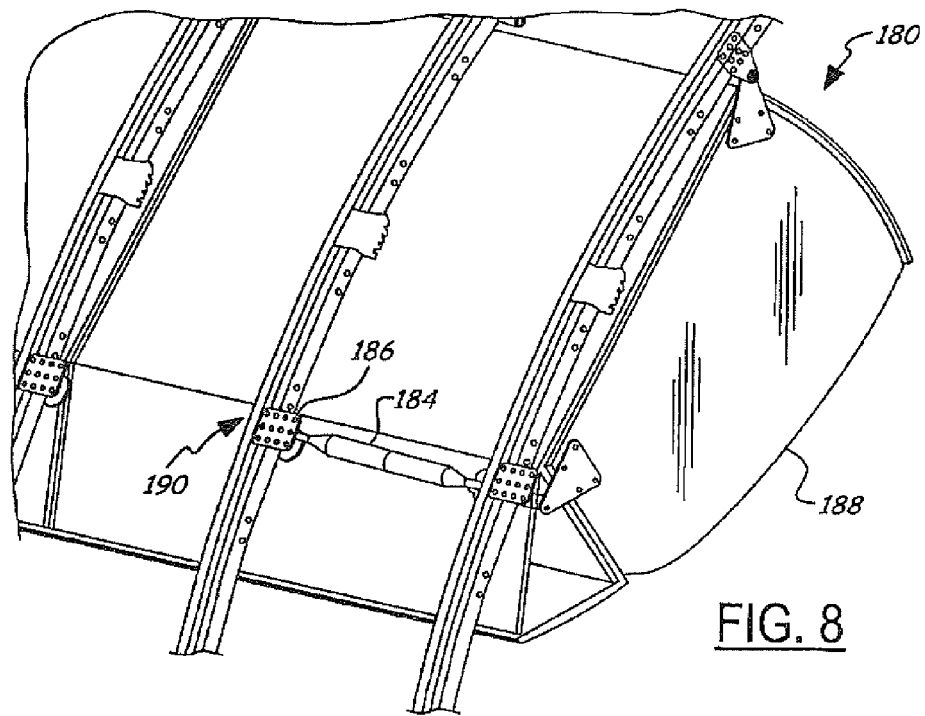
FIG. 8 is an outboard perspective view of an overhead outboard bin support system.
Figure 9:
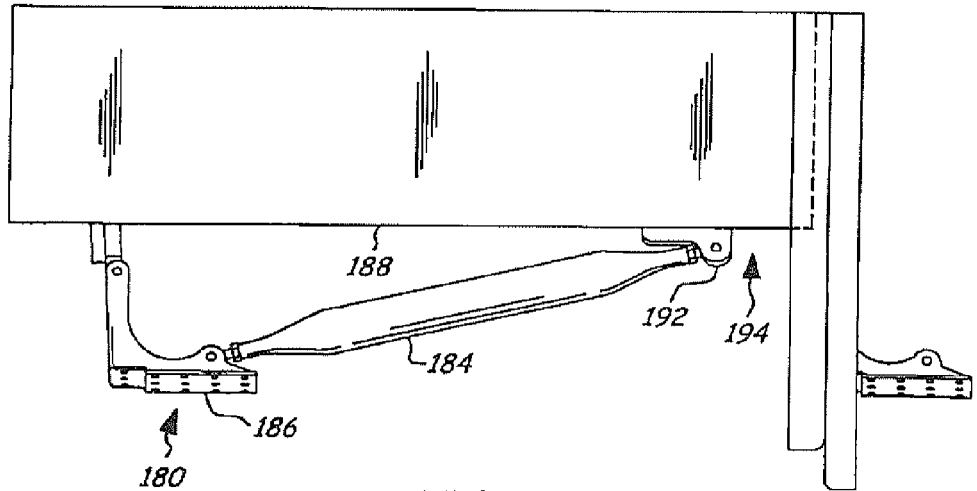
FIG. 9 is an outboard top view of the support system of FIG. 8.

Referring now to FIGS. 8 and 9, an outboard perspective view and an outboard top view of an overhead outboard bin support system 180 are shown. The outboard support system 180 includes a forward load system 182 with a fore/aft tie rod 184 coupled between a frame element clevis 186 and a bin 188. The support systems of FIGS. 1–7 may include a forward load system, such as the forward load system 180.

The forward load system 180 transfers load experienced by the bin 188 to the skin of an aircraft. The bin 188 is coupled approximately in the center 190 to the clevis 186 and to the tie rod 184 via a forward bracket 192. The forward bracket 192 couples a forward portion 194 of the bin 188.

Figure 10:
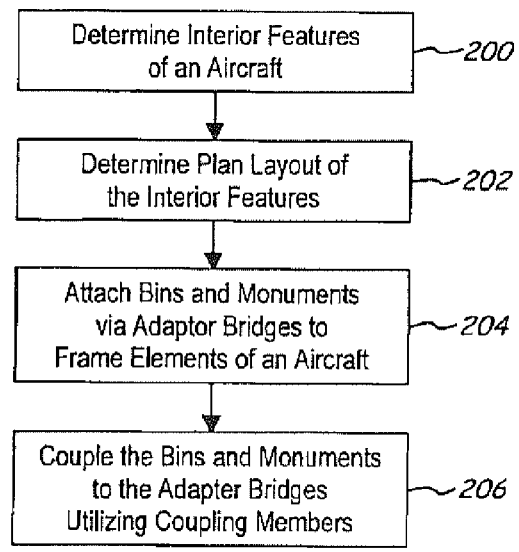
FIG. 10 is a logic flow diagram illustrating a method of configuring an overhead aircraft support system for interior features of an aircraft in accordance with an embodiment of the present invention.

Referring now to FIG. 10, a logic flow diagram illustrating a method of configuring an overhead aircraft support system for interior features of an aircraft is shown.

In step 200, the interior features of an aircraft are determined including types, styles, sizes, and quantity of seats, bins, monuments, and other interior features known in the art. In step 202, a plan layout of the interior features is determined. The plan layout includes placement of the seats, bins, and monuments.

In step 204, bins and monuments that are of irregular size, or do not align properly with frame elements of the aircraft are attached to the frame elements using adapter bridges, as described above. The bins and monuments are attached to attachment points of the adapter bridges.

In step 206, the bins and monuments are coupled to the adapter bridges and the frame elements via coupling members, such as the tie rods, struts, trusses, and brackets, as stated above.

The above-described steps are meant to be illustrative examples; the steps may be performed sequentially, synchronously, simultaneously, or in a different order depending upon the application.

The present invention provides overhead bin and monument support systems that support bins and monuments of irregular size. The support systems are also capable of accommodating for misalignment of bins and monuments relative to aircraft frame elements. The support systems minimize the amount of material and components utilized in supporting bins and monuments and the costs and weight involved therein.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A monument support system for an aircraft comprising:
    a plurality of aircraft frame elements;
    at least one adapter bridge coupled to said plurality of aircraft frame elements, each of said at least one adapter bridge having a plurality of attachment points;
    at least one coupling member having a plurality of attachment positions corresponding to said plurality of attachment points; and
    at least one monument coupled to said plurality of aircraft frame elements via said at least one adapter bridge and said at least one coupling member.

2. A system as in claim 1 further comprising at least one truss coupled between said at least one coupling member and said at least one adapter bridge.

3. A system as in claim 2 wherein said at least one truss is coupled to said at least one monument via at least one joint.

4. A system as in claim 3 wherein said at least one joint is a pin joint.

5. A system as in claim 2 wherein said at least one truss is a triangular truss.

6. A system as in claim 2 wherein said at least one truss comprises:
    a first truss coupled between a first adapter bridge and said at least one monument; and
    a second truss coupled between a second adapter bridge and said at least one monument.

7. A system as in claim 2 wherein said at least one truss is translatable relative to said at least one adapter bridge.

8. A system as in claim 1 wherein said at least one coupling member comprises:
    a first coupling member coupled between said plurality of aircraft frame elements and said at least one adapter bridge; and
    a second coupling member coupled between said at least one adapter bridge and said at least one monument.

9. A system as in claim 8 wherein said first coupling member and said second coupling member are selected from at least one of a tie rod, a lateral tie rod, a vertical tie rod, a strut, a truss, and a bracket.

10. A system as in claim 8 wherein said first coupling member, said at least one adapter bridge, and said second coupling member are in a Z-configuration.

11. A system as in claim 8 wherein said first coupling member, said at least one adapter bridge, and said second coupling member transfer load between said at least one monument and an aircraft skin.

12. A system as in claim 1 wherein said at least one monument is adjustable in position relative to said adapter bridge via said plurality of attachment points.

13. A system as in claim 1 wherein said at least one monument is selected from at least one of a galley, a stowage unit, a lavatory, and a closet.

14. An overhead bin and monument support system for an aircraft comprising:
    a plurality of aircraft frame elements;
    a plurality of adapter bridges coupled to said plurality of aircraft frame elements, each of said plurality of adapter bridges having a plurality of attachment points;
    at least one coupling member coupled to said plurality of adapter bridges and having a plurality of attachment positions corresponding to said plurality of attachment points;
    at least one bin coupled to said plurality of aircraft frame elements via said plurality of adapter bridges; and
    at least one monument coupled to said plurality of aircraft frame elements via said plurality of adapter bridges and said at least one coupling member.

15. A system as in claim 14 wherein said at least one bin is in the form of at least one of a center bin, an outboard bin, and an overhead bin.

16. A system as in claim 14 wherein said at least one bin is coupled to said plurality of adapter bridges via at least one of said at least one coupling member.

17. A system as in claim 14 wherein said plurality of adapter bridges comprise:
a first adapter bridge coupled between said plurality of aircraft frame elements and a vertical coupling member; and
a second adapter bridge coupled between said plurality of aircraft frame elements and a lateral coupling member.

18. A system as in claim 14 wherein said plurality of aircraft frame elements are arched and extend laterally and radially across the aircraft and support an aircraft skin.

19. A system as in claim 14 wherein said plurality of adapter bridges are coupled to said plurality of aircraft frame elements via a plurality of brackets.

20. A system as in claim 19 wherein said plurality of brackets are selected from at least one of a clevis, a clevis having an extended foot, a fitting, and a frame pivot fitting.

21. A system as in claim 14 wherein said plurality of adapter bridges are coupled to said plurality of aircraft frame elements via at least one frame pivot fitting and is rotatable relative to said at least one frame pivot fitting.

22. A system as in claim 14 wherein said plurality of adapter bridges comprise:
a first adapter bridge coupled to a lower portion of said at least one bin; and
a second adapter bridge coupled to an upper portion of said at least one bin.

23. A system as in claim 22 wherein said first adapter bridge is non-rotatable.

24. A system as in claim 22 wherein said second adapter bridge is rotatable.

25. A system as in claim 22 wherein said first adapter bridge is coupled to said plurality of aircraft frame elements via a fixed clevis.

26. A system as in claim 22 wherein said second adapter bridge is coupled to said plurality of aircraft frame elements via a frame pivot fitting.

27. A system as in claim 14 wherein said at least one coupling member is selected from at least one of a tie rod, a lateral tie rod, a vertical tie rod, a strut, a truss, and a bracket coupled between said plurality of aircraft frame elements and said at least one bin.

28. A system as in claim 14 wherein said at least one bin is coupled to said plurality of aircraft frame elements via at least one coupling member selected from a tie rod, a strut, and a bracket.

29. A system as in claim 14 further comprising:
a first set of coupling members coupled between said plurality of adapter bridges and said at least one bin; and
a second set of coupling members coupled between said plurality of aircraft frame elements and said at least one bin.

30. A system as in claim 14 wherein said plurality of adapter bridges comprises a plurality of sides, each side having a plurality of attachment points.

31. A system as in claim 14 wherein said plurality of adapter bridges is formed of a plurality of bridge plates.

32. A system as in claim 14 wherein said at least one bin is position adjustable relative to said at least one adapter bridge via said plurality of attachment points.

33. An overhead bin and monument support system for an aircraft comprising:
a plurality of aircraft frame elements;
a plurality of bin adapter bridges and monument adapter bridges coupled to said plurality of aircraft frame elements, each of said plurality of monument adapter bridges having a plurality of attachment points;
at least one coupling member coupled to said plurality of monument adapter bridges and having a plurality of attachment positions corresponding to said plurality of attachment points;
at least one bin coupled to said plurality of aircraft frame elements via said plurality of bin adapter bridges; and
at least one monument coupled to said plurality of aircraft frame elements via said plurality of monument adapter bridges and said at least one coupling member.

34. A system as in claim 33 wherein said plurality of adapter bridges comprise:
a first adapter bridge coupling said at least one bin to said plurality of aircraft frame elements; and
a second adapter bridge coupling said at least one monument to said plurality of aircraft frame elements.

35. An aircraft comprising:
a skin;
a plurality of aircraft frame elements coupled to said skin; and
an overhead bin support system comprising:
at least one adapter bridge coupled between at least one pair of aircraft frame elements, said at least one adapter bridge having a plurality of attachment points; and
at least one bin coupled to said plurality of aircraft frame elements via said at least one adapter bridge and having a plurality of attachment positions corresponding to said plurality of attachment points.

36. An aircraft as in claim 35 wherein said at least one bin is position adjustable relative to said at least one adapter bridge via said plurality of attachment points.

37. An aircraft comprising:
a skin;
a plurality of aircraft frame elements; and
an overhead monument support system comprising:
at least one adapter bridge coupled to said plurality of aircraft frame elements, each of said at least one adapter bridge and having a plurality of attachment points;
at least one coupling member coupled to said at least one adapter bridge and having a plurality of attachment positions corresponding to said plurality of attachment points; and
at least one monument coupled to said plurality of aircraft frame elements via said at least one adapter bridge and said at least one coupling member.

38. An aircraft as in claim 37 wherein said at least one monument is position adjustable relative to said at least one adapter bridge via said plurality of attachment points.

39. A method of configuring an overhead aircraft support system for interior features of an aircraft comprising:
determining interior features;
determining a plan layout of said interior features; and
attaching bins and monuments to a plurality of aircraft frame elements via a plurality of adapter bridges in response to said plan layout, said plurality of adaptor bridges coupled between at least one pair of said plurality of aircraft frame elements and each of which having a plurality of attachment points corresponding to a plurality of bin and monument positions.

40. A method as in claim 39 further comprising coupling a plurality of coupling members between said plurality of adapter bridges and said bins and monuments.

* * * * *